A. J. REYNOLDS.
Fruit-Drier.

No. 165,121.            Patented June 29, 1875.

Witnesses:
C. H. Watson
L. L. Bond

Inventor:
Andrew Jackson Reynolds

UNITED STATES PATENT OFFICE.

ANDREW JACKSON REYNOLDS, OF CHICAGO, ILLINOIS.

IMPROVEMENT IN FRUIT-DRIERS.

Specification forming part of Letters Patent No. 165,121, dated June 29, 1875; application filed June 25, 1875.

*To all whom it may concern:*

Be it known that I, ANDREW JACKSON REYNOLDS, of Chicago, in the county of Cook and State of Illinois, have invented certain new and useful Improvements in Fruit-Driers or Evaporators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of this invention relates to certain improvements in the construction and operation of an improved apparatus for curing fruits, vegetables, meats, and other articles which it is desired to preserve in a fresh or unpickled state; and its object is to provide an apparatus that will be simple and effective in its operation, as will be hereinafter more fully set forth.

Figure 1:
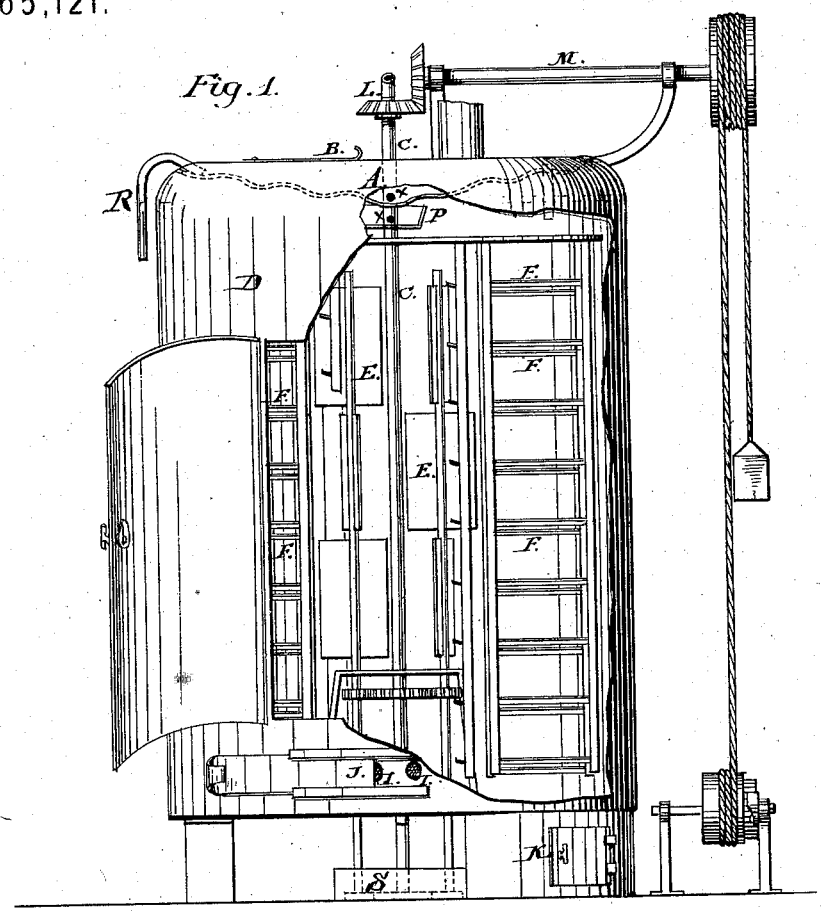
Figure 2:
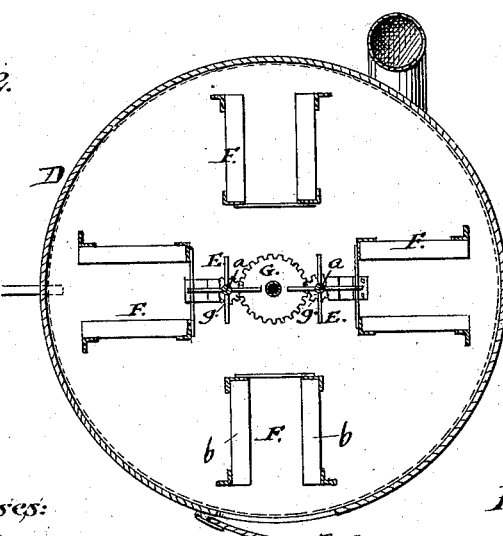

In the accompanying drawing, Figure 1 is a side elevation of my fruit-drier, with a part of the case or dry-house broken open to show the interior thereof; and Fig. 2 is a horizontal section of the same.

D represents the outer case or dry-house, provided at one side under its bottom with a furnace, K, to give heat to the fruit within the dry-house. Near the bottom of the case D are openings I I, provided with a slide, J, for admitting or shutting off cold air, as required. In the top of the dry-house is a valve, B, for the escape of damp air, &c. C is a hollow shaft passing vertically through the center of the drier, and to said shaft, within the drier, a suitable distance below the top, are attached horizontal arms $b\ b$, from which are suspended racks F F, to receive the trays containing the fruit or other articles to be dried. On the upper end of the shaft C is a gear-wheel, L, meshing with a similar wheel on a horizontal shaft, M, which may be rotated by means of weights, as shown in the drawing, or by any other suitable means, so as to impart a rotating motion to the hollow shaft C, with its racks suspended therefrom. On the shaft C within the drier is a cog-wheel, G, which gears with pinions $g\ g$ upon two vertical shafts, $a\ a$, having fans or wings E E attached to them. It will thus be seen that the screens F revolve around the fans E, and the fans rotate on their axis in the opposite direction, whereby a perfect circulation of air is created in all parts of the evaporator alike. In the upper part of the dry-house, to the hollow shaft C is secured a large pan, A, and below the same is a small pan, P, also secured to the shaft. Immediately above said pans perforations $x\ x$ are made in the hollow shaft C. R is a pipe passing into the top of the dry-house to admit water into the pan A, which pan forms a condenser for condensing the moisture in the air within the dry-house on the under side of the pan, which condensation drops down into the drip-pan P, and thence through the hollow shaft C into a waste-tank, S, underneath. The water in the condensing-pan A also passes through the hollow shaft to said waste-tank, so that the tube or shaft thus also becomes a condenser.

This drier or evaporator is simple in construction, not liable to get out of order, and the heat can be easily regulated. The fruit will be dried in a thorough manner, without losing any of its flavor, in less than two hours, and by the use of my compound rotating condenser, extending centrally the entire length of the dry-house, and over the entire surface of the top, the expense of fuel is greatly reduced.

The hollow shaft C may be of common gas-pipe large enough for the purpose, and should be kept full, or nearly so, of cold water, and discharged at the lower end as often as necessary for condensing purposes.

By a proper use of my condenser and evaporator any desired quality of dried products may be produced in any common room without sweating or steaming the fruits, which destroys the natural flavor and consistency of the product; and without building very expensive high buildings or towers, as is now often done, where the fruit is placed over a furnace and raised to a considerable altitude to allow the condensation to take place while the fruit is over the fire, which is necessary to produce a product proof against decay or change, enhanced in ripeness, sweetness, and characterized by its natural color, and which cannot be injured, as dried substances are apt to be, by the moisture of damp weather or damp places or climates, or of being reduced in dry atmosphere to a parched and brittle consistency.

I would also state that by this process of evaporation and condensation new potatoes and green corn in the ear may be so preserved (dried) as to retain all their original flavor so rapid and economically that they may be had in all great cities and foreign markets as cheap as the original products in their natural state, thus avoiding all possibility of decay from frosts or other causes.

Having thus fully described my invention, what I claim as new, and desire to secure by Letters Patent, is—

1. In a fruit-drier, a condenser extending centrally through the entire length of the dry-house, and also filling, or nearly filling, the top thereof, substantially as and for the purposes herein set forth.

2. The revolving shelf-frame F, in combination with the fans E, operated by hollow shaft C, for the purposes herein set forth.

3. The combination of the shelf-frame F and fans E with the furnace K and condenser A C, substantially as and for the purposes herein set forth.

4. The combination of the drip-pan P with the condenser A and hollow shaft C, substantially as and for the purposes herein set forth.

In testimony that I claim the foregoing as my own I affix my signature in presence of two witnesses.

ANDREW JACKSON REYNOLDS.

Witnesses:
  C. H. WATSON,
  H. A. HALL.